(12) United States Patent
Krunz et al.

(10) Patent No.: US 10,645,589 B2
(45) Date of Patent: May 5, 2020

(54) METHOD FOR IMPROVING SPECTRUM SENSING AND EFFICIENCY IN COGNITIVE WIRELESS SYSTEMS

(71) Applicant: Arizona Board of Regents on Behalf of the University of Arizona, Tucson, AZ (US)

(72) Inventors: Marwan M. Krunz, Tucson, AZ (US); Wessam Ahmed, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 4 days.

(21) Appl. No.: 15/797,306

(22) Filed: Oct. 30, 2017

(65) Prior Publication Data

US 2018/0049038 A1    Feb. 15, 2018

Related U.S. Application Data

(63) Continuation of application No. 14/785,007, filed as application No. PCT/US2014/033479 on Apr. 9, 2014, now abandoned.

(60) Provisional application No. 61/812,595, filed on Apr. 16, 2013.

(51) Int. Cl.
| | |
|---|---|
| *H04W 4/00* | (2018.01) |
| *H04W 16/14* | (2009.01) |
| *H04W 74/08* | (2009.01) |
| *H04L 12/66* | (2006.01) |
| *H04W 72/08* | (2009.01) |
| *H04W 76/14* | (2018.01) |

(52) U.S. Cl.
CPC .......... *H04W 16/14* (2013.01); *H04L 12/66* (2013.01); *H04W 72/082* (2013.01); *H04W 74/0808* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 2009/0247201 A1* | 10/2009 | Ye ......................... | H04W 16/14 455/509 |
| 2011/0246411 A1 | 10/2011 | Laneman et al. | |
| 2012/0039183 A1* | 2/2012 | Barbieri ................ | H04W 16/14 370/241.1 |
| 2012/0129467 A1* | 5/2012 | Wang .................... | H04W 16/14 455/67.14 |
| 2012/0195212 A1* | 8/2012 | Zhang ................ | H04W 72/1215 370/252 |

(Continued)

*Primary Examiner* — Clemence S Han
(74) *Attorney, Agent, or Firm* — Stuart H. Mayer; Mayer & Williams PC

(57) ABSTRACT

Systems and methods for adaptive method exploits self-interference suppression (SIS) and full-duplex (FD) capabilities in cognitive radio and dynamic spectrum access (DSA) systems to enable simultaneous transmission-and-sensing (TS) or transmission-and-reception (TR) over the same frequency channel in a single operation. The adaptive methods enable secondary users or units (SUs) to switch between different modes of operation, taking into account the primary units (PUs) state, the SUs' traffic, and standards' rules. These adaptive methods significantly enhance the SU throughput and reduce the probability of colliding with PU transmissions.

19 Claims, 11 Drawing Sheets

(56) References Cited

U.S. PATENT DOCUMENTS

2012/0236201 A1    9/2012  Du et al.
2012/0238201 A1*  9/2012  Du ........................ H04B 17/345
                                                               455/7

\* cited by examiner

METHOD FOR IMPROVING SPECTRUM SENSING AND EFFICIENCY IN COGNITIVE WIRELESS SYSTEMS

CROSS-REFERENCE TO RELATED APPLICATION

This application is a continuation of U.S. application Ser. No. 14/785,007, filed Oct. 15, 2015, which is a 371 National Stage of PCT/US14/33479, filed Apr. 9, 2014, which claims priority to U.S. Provisional Application No. 61/812,595, filed Apr. 16, 2013, the contents of which are all incorporated herein by reference.

FIELD OF THE INVENTION

The present invention is directed generally to systems and methods for accessing wireless networks, and more specifically, to systems and methods for adapting the operation of a software-defined wireless device that operates in an opportunistic spectrum access (OSA) environment.

BACKGROUND

Wireless communication technology has evolved greatly over recent years. Recent studies have shown that the wireless spectrum in the U.S. is under-utilized, although much of the spectrum below 6 GHz has been assigned to licensees, or primary users (PUs). Therefore, spectrum sharing has been proposed to alleviate spectrum scarcity that prevents new wireless services from being deployed. Cognitive radio is a promising technology that can allows secondary users (SUs) to access the spectrum opportunistically on a non-licensed basis, provided that they do not harm the transmissions of PUs. To do that, cognitive radios operated by SUs may sense PU communications activity over the wireless channel in order to avoid a collision, which occurs if a radio device receives two simultaneous transmissions over the same frequency channel.

Cognitive radio technology enables opportunistic spectrum access (OSA). OSA is a new paradigm in wireless communications that allows secondary (unlicensed) users to opportunistically access temporarily idle licensed channels. These SUs generally need to follow a certain protocol that ensures that the secondary transmissions will not negatively impact any ongoing or future communications of the primary (licensed) users.

A commonly accepted scheme for protecting PUs from SU transmissions is called Listen-Before-Talk (LBT). In the LBT scheme, an SU device has to periodically interrupt its transmission (e.g., once every two seconds) and sense the channel for PU activity (transmissions). If the sensing outcome is positive (i.e., with high probability, the SU suspects that the channel is being used for PU transmission), the SU has to abort transmission over that channel and switch to another channel (in which case, the sensing process has to be conducted over the new channel). Otherwise, if the outcome is negative, the SU proceeds with its transmission until the next sensing attempt. Because of interference and noise, the outcome of the sensing process is not 100% accurate, so it may result in false positives (false alarm) and false negatives (mis-detection). False negatives are particularly significant, as they result in SU transmissions interfering with PU receptions.

In addition to their limitations arising from false alarms and misdetection, the LBT scheme inherently results in a reduction in the SU throughput because the SU has to interrupt its transmission to sense the spectrum for PU activities.

SUMMARY

In accordance with one aspect of the invention, improved primary user (PU) detection and/or a higher secondary user (SU) throughput may be achieved in an OSA system. In particular, systems and methods are disclosed which exploit self-interference suppression (SIS) and full-duplex (FD) capabilities in cognitive radios and opportunistic spectrum access (OSA) systems to enable simultaneous transmission-and-sensing (TS) or transmission-and-reception (TR) over the same frequency channel in a single operation. The methods enable SUs to switch between different modes of operation, taking into account the PUs' state, the SUs' traffic, and FCC regulations. These adaptive methods significantly enhance the SU throughput and reduce the probability of colliding with PU transmissions.

DETAILED DESCRIPTION

Figure 1:
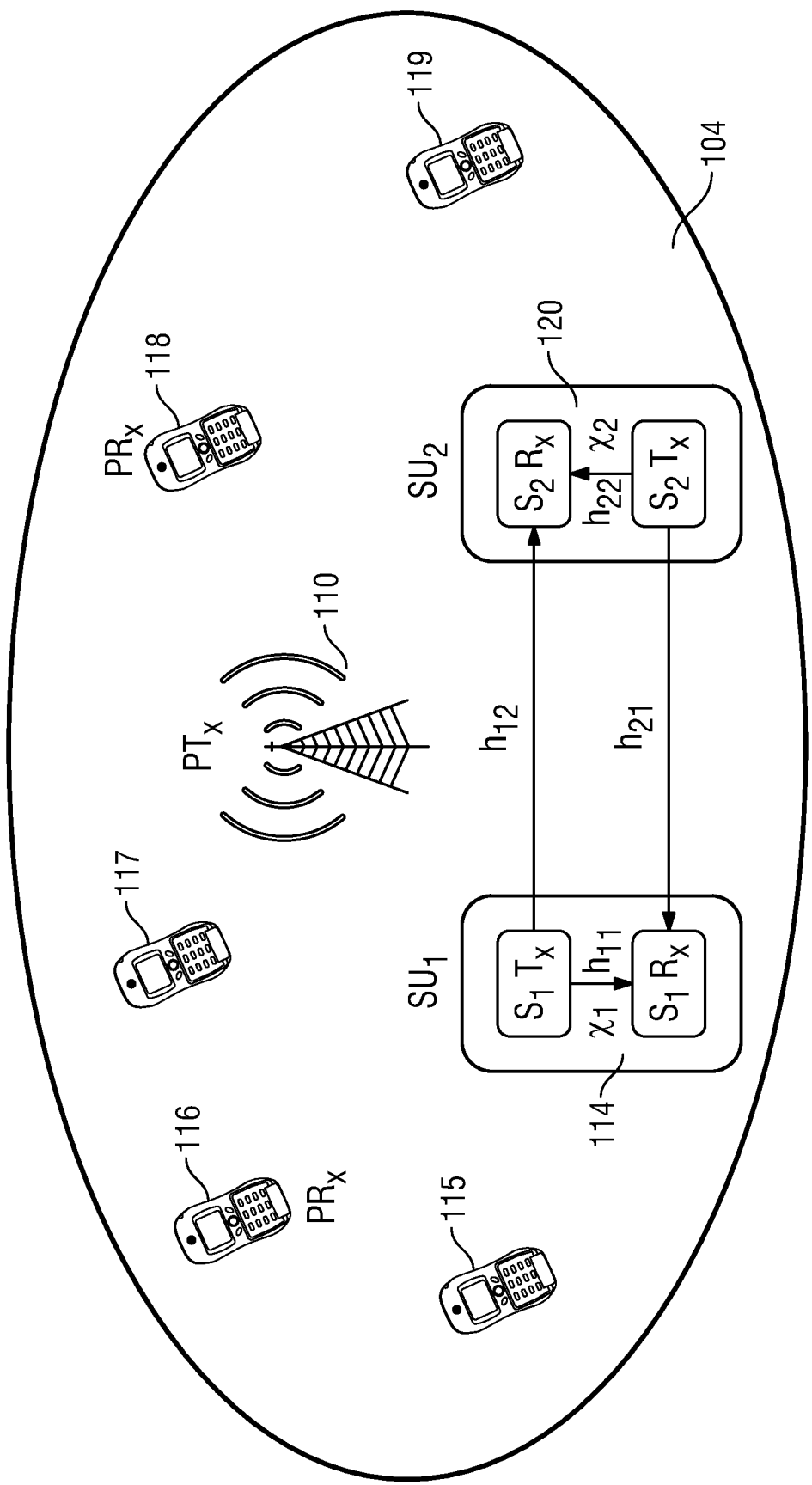
FIG. 1 is a system model for a secondary user link that consists of two SUs, which opportunistically access the spectrum of a primary network. The primary network may be a primary transmitter ($PT_X$) and one or more primary receivers ($PR_X$).

Until recently, the idea that a wireless device can transmit and receive simultaneously on the same frequency channel, i.e., operate in full-duplex (FD) mode, was deemed impossible. The traditional scenario was that at a given time, a node can transmit or receive, but not both, which is often called half-duplex (HD) operation.

The problem of achieving FD communications is that the transmitted power from a given wireless device is typically much larger than the received power of another signal that this device is trying to capture. While the device is receiving the second signal, its own transmitted signal is considered self-interference. The infeasibility of FD communications has recently been challenged by several efforts [6-9], which have successfully demonstrated the possibility of FD communications using self-interference suppression (SIS) techniques.

There are two main approaches for SIS: radio frequency (RF) interference cancellation and digital baseband interference cancellation. Combined, these two approaches may still not achieve the amount of SIS required for FD operation. Recently, other SIS techniques have been developed, and used in conjunction with traditional SIS techniques. These new SIS techniques combine phase shifters, circulators, etc., to try to model the distorted transmitted signal and subtracts its effect from the received signal. Recent studies have shown that a transmitting device can significantly suppress its own interference by up to 110 dB, enabling it in certain scenarios to concurrently transmit and receive.

An inherent problem in the traditional LBT scheme used in OSA systems is that it results in a reduction in the SU throughput. Using the adaptive strategy discussed herein, the SU can carry out the spectrum sensing process while transmitting its data. That is, aided with SIS techniques, the SU operates in a simultaneous transmission-sensing (TS) mode. This has two advantages over the LBT scheme. First, from the SU perspective, transmitting while sensing will enhance the SU throughput since the SU no longer needs to interrupt its transmission period. Second, from the PU detection perspective, the SU can monitor the PU activity while transmitting. Hence, a better detection performance is achieved because there is always a certain probability that the PU becomes active again during the SU transmission period. Spectrum sensing cannot be perfect, because of various factors such as channel fading/attenuation, sources of interference that cannot be unaccounted for, device sensitivity, etc. Thus, it is possible to encounter false-positives and false-negatives in the spectrum sensing process. A false positive (the SU thinks there is a PU activity over the channel, although this is not the case) is associated with a probability of false alarm. Likewise, a false negative (SU thinks the PU is silent, although this is not the case) is associated with a probability of mis-detection. The system is typically designed to ensure that both probabilities are below given (pre-determined) values.

Another problem in current cognitive wireless systems is their relatively low transmission rates. Devices have to use a multiple access scheme such as OFDMA or TDMA to communicate in a networked environment. They cannot transmit and receive simultaneously on the same frequency. By applying the adaptive strategy, SUs can operate in a combined transmission-reception (TR) mode, which enhances the throughput. One important consideration in developing the adaptive strategy is to determine an optimal method of switching between the various modes of operation for the SU device due to the highly dynamic nature of wireless devices, which adds a risk due to the probability of collision with the PU.

In accordance with one aspect of the invention, an adaptation method that exploits self-interference suppression (SIS) capabilities in an SU device is employed to improve the sensing efficiency and/or the throughput for the SUs. Throughput is the number of successfully received bits per second over a channel of a given bandwidth. Using this adaptation method, an SU can switch between a transmission-sensing (TS) mode and transmission-reception (TR) mode. This method has been shown through simulations to significantly enhance the SU throughput (when operating in the TR mode) and provides an improvement in the PU detection (when operating in the TS mode).

FIG. 1 shows an illustrative operating environment that includes a two-tier (primary/secondary) wireless communications system 104. The wireless communication system 104 may provide various communication services; for instance, voice, video, packet data, broadcast, and messaging services. The system 104 includes a primary transmitter ($PT_X$) 110 in communication with one or more primary receivers ($PR_X$) devices 115 to 119. Primary transmitter 110 may be a TV broadcast station, a cellular base station, or any other primary transmitting device. Receivers 115 to 119 may be TV receivers, cellular mobile phones, or any possible primary receiving devices. System 104 also includes at least one SU link between SU 114 and SU 12 0. SUs 114 and 120 can communicate as peer-to-peer or through a secondary base station to organize the operation between them. The base station 110 may be operable over any range of coverage areas, including but not limited to network cells such as macro cells, femto cells, pico cells, and so on.

The wireless system may be a packet-switched or circuit-switched network and may employ any of a variety of different wireless communication standards and modulation techniques. For example, in the case of a packet-switched network, the techniques described herein can be used in such illustrative systems as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (Wi-MAX), IEEE 802.20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink.

The term "wireless communication device" or simply "wireless device" is intended to broadly cover many different types of devices that can wirelessly transmit and receive signals which may operate in a wireless communication system. For example, a wireless communication device can include (but is not limited to) any one or a combination of the following: a two-way radio, a cellular telephone, a mobile phone, a smartphone, a desktop or portable computer, a tablet computer, an automotive or residential gateway, and the like.

In the example of FIG. 1 two of the wireless devices, 114 and 120, are designated as secondary users SU1 and SU2 which communicate with one another over an SU link. $SU_1$ and $SU_2$ may opportunistically access one of N licensed channels employed in a primary network that includes the primary transmitter 110 and primary receivers 115-119.

The SUs employ cognitive radio technology to share the spectrum assigned to the PUs using an opportunistic approach. With this approach, the SUs share the spectrum with the PUs as well as those operating under authorization on a secondary basis. Under these conditions, it is important that any user in the cognitive radio system not interfere with primary users. As illustrated in FIG. 1 an $SU_i$ includes a transmitter ($S_iT_X$) and a receiver ($S_iR_X$), where i=1 or 2. $h_{ij}$ denotes the channel gain from transmitter i to receiver j.

Each SU is assumed to have partial or complete SIS capability, allowing it in some cases to transmit and receive/sense at the same time. Any suitable SIS technique or a combination of SIS techniques may be employed.

In accordance with one aspect of the invention, an efficient decision mechanism is provided for operating the SU link between the SUs. In particular, the decision mechanism determines when and how an SU link is going to switch between the TS and the TR modes (in addition to the traditional HD mode) to maximize the SU utility (e.g., throughput) subject to a given collision probability for PU transmissions. It should be noted that the FCC and other standardization/regulatory organizations have established rules for secondary opportunistic access to the licensed spectrum in the broadcast TV band. Hence, the three-stage decision method described below accounts for the PU state, the SU traffic, and FCC regulations. Before describing the decision method, some concepts are first discussed.

Sensing-Only-Algorithm (SOA): To initiate a communication link between two SUs, the initiating SU generally needs to find an idle channel from the available N licensed channels. Because the SU does not know the status of these channels (idle or busy), it executes an SOA. First, the SU chooses a channel from the available N channels to sense. Different ordering mechanisms can be applied for this purpose. If the outcome of the sensing process is "idle," the SU decides to communicate on this channel. However, if the outcome of the sensing process is "busy," the SU has to decide whether to spend more time in this channel and continue sensing in the event that the PU leaves the channel or switch to another channel and lose the measurements obtained so far. The SU continues sensing and switching between different channels until it finds one that is deemed to be idle. An association process has to be executed after the SOA to establish a connection between the two SUs. Once a connection is established, the SU will start applying the three-stage decision method to fully utilize this spectrum opportunity while maintaining a certain detection performance for PU activity.

Master and Slave Nodes: A master node is a designation given to any SU device that executes the three-stage decision method discussed below. The master node is the node that makes a final decision about the operation mode, whether receiving data while transmitting, sensing the spectrum while transmitting, switching to another channel, or solely sensing the spectrum. The slave node is the SU device that is receiving orders from the master node with regard to starting, continuing, or stopping transmission. This is done through control packets. In the present design, the node that initiates the communication is the master node and the other one is the slave node. However, in some implementations these roles may change over time, depending on which node has traffic to send (i.e., the traffic directionality).

Data and Control Phases: This concept is related to the organizing protocol used between SUs to communicate with each other. Once a channel is thought to be idle by the initiating SU, the time frame will be divided into two alternating phases: a data phase and control phase. The SUs will start communicating together in the data phase where data packets only are exchanged. The data phase involves unidirectional (half-duplex) or bidirectional (full-duplex) transmission of information, such as (one or more) data packets. It may also include a segment of digitized and compressed voice/video. Spectrum sensing is also executed in the data phases. Each data phase is followed by a control phase, which has the following two goals. First, the control phase is used to confirm the correct reception of packets transmitted in the previous data phase in both directions (if applicable). This is accomplished through the acquisition of certain parameters (ACKs/NACKs, belief probabilities, etc.). The parameters may be communicated through explicit signaling messages or they may be piggybacked on data packets. Second, the control phase is used to assign the roles of master and slave to the two communicating SUs. Once assigned, the control phase is also used by the master node to trigger the slave node to start and to execute the adaptive algorithm described below. If the two nodes switch to another channel, they will apply the SOA and terminate the data and control phases. In SOA, the sensing durations can be optimized separately, without the data and control phases restrictions.

The description of the three stages of the adaptive method is as follows:

Stage 1: Belief Stage: In this stage, the master node follows a threshold-based policy that returns the maximum utility to the SU link, possibly subject to one or more constraints. Depending on the belief value (defined as the probability that the PU is idle as perceived by the SU), the SU will decide to operate in one of four modes: TR, TS, sensing-only (SO), or channel switching (CS). The SU needs to update its belief after each action. This belief update depends on the outcome of the action taken; whether free (F) or busy (B) in case of sensing, decoded (D) or undecoded (U) in case of receiving data, or ACK (A) or NACK (N) in case of transmitting data. Although this decision is optimal in the sense that it will return the maximum utility to the SU (subject to imposed constraints), it is not the final decision. The SU has to continue with the second and third stages before making its final decision.

Stage 2: Traffic Stage: The four possible modes (TR, TS, SO, and CS) represent a single SU's perspective. However, the link's operation is actually determined by the operating modes of the two communicating SUs. Hence, these modes of operation are expressed as follows: TR-TR, TS-R or R-TS, SO, and CS. For instance, if an SU is transmitting and receiving data simultaneously, the other secondary node will also be transmitting and receiving data, which is indicated by the TR-TR mode. The outcome of the first stage is the optimal operation mode that will return the maximum utility. The SU should execute the following steps in order to determine the final decision:

If the optimal decision in the belief stage is SO or CS, then the final decision in the traffic stage is the same as the optimal decision.

If the optimal decision in the belief stage is TR-TR, the two secondary users will make the final decision based on whether or not each node has more data in its queue to transmit. The master node can determine if either node has more data to transmit in a variety of different ways. For instance, in a packet-switched network, a "more packets" (MP) bit may be located in the header of each packet This MP bit determines whether a certain node has more packets in its queue or not. Table 1 shows one example of how the final decision is determined in a packet-switched network when the outcome of the belief stage is the TR-TR mode. In this example an MP bit of '1' indicates that a node has more packets in its queue and MP bit of '0' indicates that the queue is empty.

TABLE 1

| MP for SU A | MP for SU B | Final Decision |
|---|---|---|
| 0 | 0 | Abort communication after retransmitting corrupted packets, if any |
| 1 | 0 | TS-R |
| 0 | 1 | R-TS |
| 1 | 1 | TR-TR |

If the optimal decision in the belief stage is TS-R, the two SUs may again utilize the MP bit in the packet header to determine the final decision, as shown in Table 2.

TABLE 2

| MP for SU A | MP for SU B | Final Decision |
|---|---|---|
| 0 | 0 | Abort communication after retransmitting corrupted packets, if any |
| 1 | 0 | TS-R |
| 0 | 1 | R-TS |
| 1 | 1 | TS-R (if SU1 is the master node) |
| 1 | 1 | R-TS (if SU2 is the master node) |

Stage 3: Periodic Sensing Stage: Existing OSA standards and FCC regulations impose rules for operating opportunistic wireless networks. One of these rules is the need to periodically sense the operating channel, which means that any channel used by an SU has to be sensed every T seconds to check for PU activity. The SU has to vacate the channel quickly if a PU activity is detected. Hence, the third stage of the decision strategy is that communicating SUs have to maintain a maximum duration of T seconds between sensing periods, whenever they are operating in the SO, TS-R, or R-TS modes.

Simultaneous Transmission-and-Sensing (TS) Mode

Figure 11:
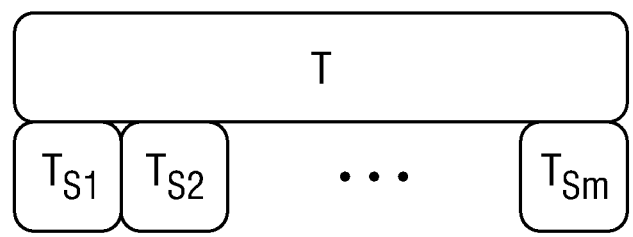
FIG. 11 illustrates one example of the structure of the simultaneous transmission-and-sensing (TS) mode.

FIG. 11 shows one example of the structure of the simultaneous transmission-and-sensing (TS) mode, where the SU starts transmitting for a certain duration T. In parallel, the SU starts its first sensing period, which lasts for a duration $T_{S1}$. If the outcome of the first sensing action is 'free', the SU checks whether the transmission duration T has ended. If the SU is still transmitting data, it then proceeds to the second sensing action $T_{S2}$. However, if the outcome of the first sensing action is 'busy', the SU quickly aborts communication and vacates the channel to prevent collision with PU's transmissions. To sum up, the SU keeps sensing the spectrum while transmitting as long as it is getting 'free' outcomes (i.e., PU is sensed 'free'). Once the SU gets a 'busy' outcome, it stops its transmission. Waveform-based sensing can differentiate between different types of signals. Hence, it should be used in the TS mode to sense the spectrum in the m sensing durations $T_{Si}$, i=1, 2, . . . , m, especially with imperfect SIS (where the self-interference signal cannot be suppressed completely). Energy detection cannot be used in these parallel sensing periods as it cannot differentiate between the self-interference signal and the PU's signal.

Illustrative Algorithm

Figure 2:
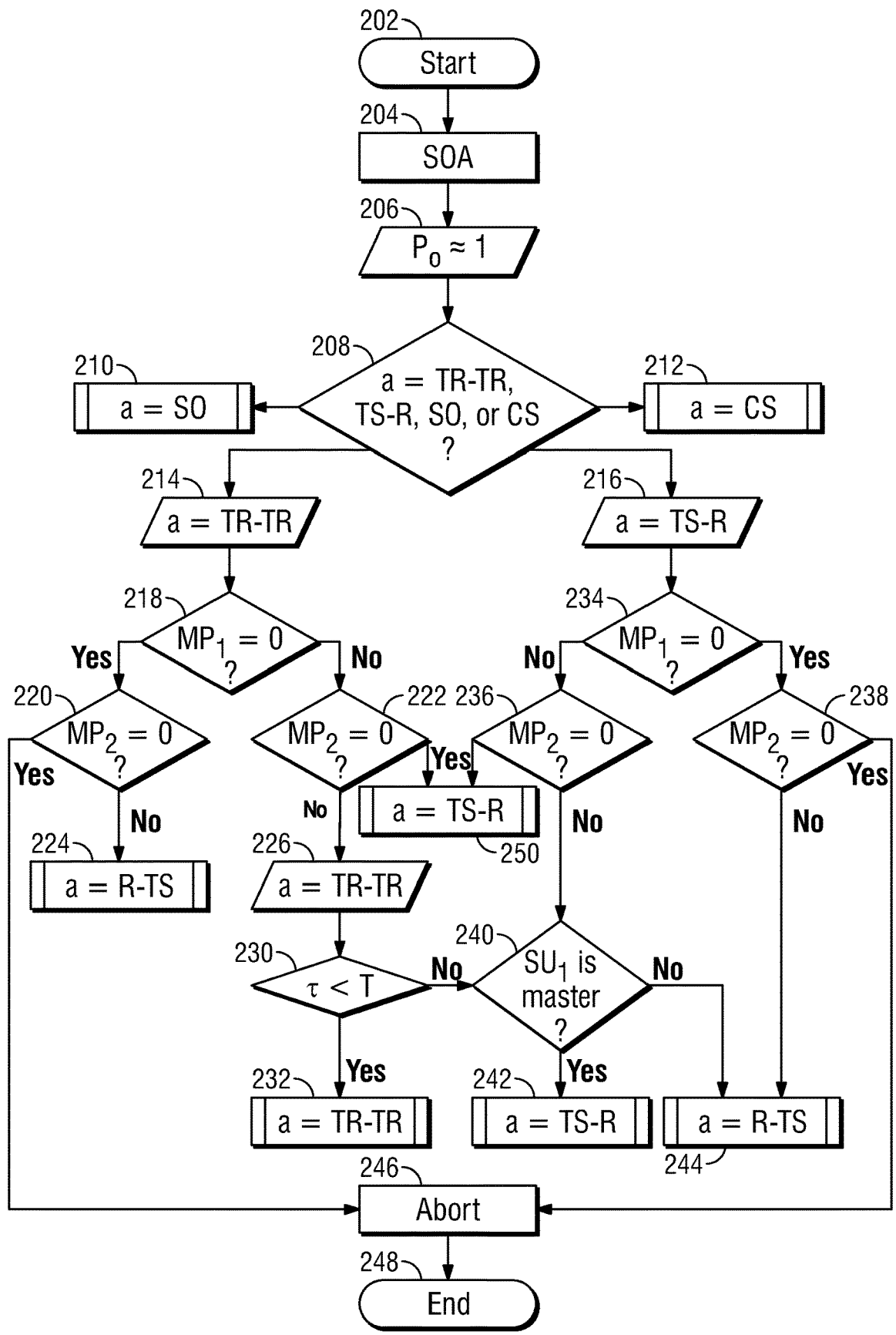
FIG. 2 is a flowchart of a three-stage decision method, including representations of sub-processes illustrated in FIGS. 3, 4, and 5.
Figure 3:
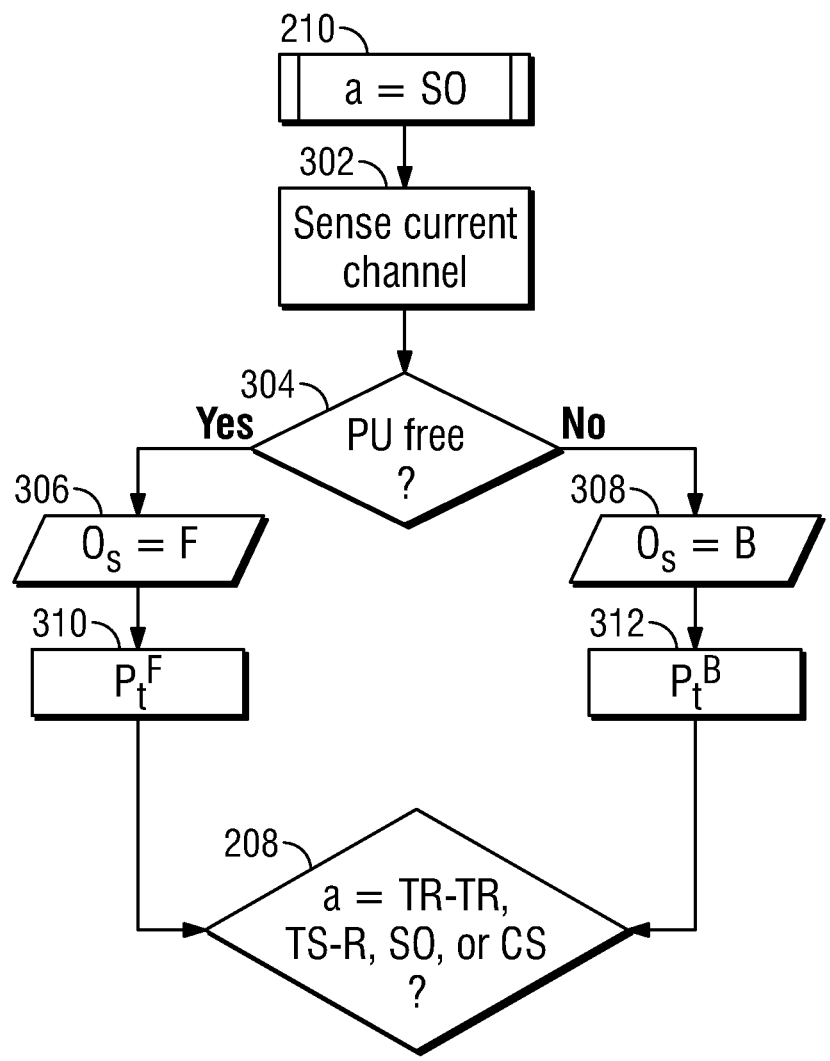
FIG. 3 is a flowchart illustrating a sensing-only (SO) mode of operation.

FIG. 2 represents one illustrative implementation of the three-stage algorithm. There are sub-processes illustrated in FIG. 2 that refer to other flowcharts shown in FIGS. 3, 4, and 5. The method starts at block 202 and continues to block 204, where, as mentioned before, the master SU starts with the SOA to initiate a communication link with the slave SU node. The master SU continues sensing and switching between different channels until it senses an idle one. As block 206 indicates, it is assumed that the belief p, which denotes the probability that the PU is idle, is 1 at time 0 (i.e., $p_o=1$). Time 0 is the start of the time frame, where the SU starts applying the three-stage adaptive method. As shown in FIG. 2, the SU will enter the first stage, the belief stage, with $p_o=1$. The master node will then apply equation (1) below to find the optimal decision at decision block 208 from the given action space a={TR-TR, TS-R, SO, CS}.

$$U_S(p, t) = \max (U_{TR}(p, t), U_{TS}(p, t), U_{SO}(p, t), U_{CS}(p, t)) \quad (1)$$

Subject to collision probability constraints where $U_S(p, t)$ is the SU utility. This utility is set to the maximum of the utilities achieved if the SU takes the action of TR-TR, TS-R, SO, or CS, which are denoted by $U_{TR}(p, t)$, $U_{TS}(p, t)$, $U_{SO}(p, t)$, and $U_{CS}(p, t)$, respectively. A utility is the benefit (e.g., link throughput) that the system achieves by operating in a certain fashion. In the current disclosure, an SU has the option of operating in different modes. Each mode results in a certain utility value, which depends on the system parameters as well as the operational environment. To achieve the best benefit for the given system parameters, the SU selects the best (highest) of the possible utilities, and its associated mode of operation. Hence, the belief stage primarily includes two steps, updating the belief and finding the optimal action. The above strategy is threshold-based, which means that the SU can compare the likelihood that the channel is idle (p) with different thresholds to determine the optimal operation mode.

Since only the startup has been discussed, the belief update step is not so clear. It will be discussed next. If the optimal action is SO, the method proceeds from block 208 to block 210, where the final decision for the master node will be the same as the optimal decision according to the rules of the traffic and the periodic sensing stages. In this case, the master node will follow the steps shown in FIG. 3, where the SU performs the action SO at block 302 and updates its belief according to the outcome of the sensing operation. The observation space in case of sensing is O={F, B}, where 'F' denotes free and 'B' denotes busy. The method proceeds to block 306 if the outcome is 'F' and to block 308 if the outcome is 'B'. The updated belief values in the case of free and busy outcomes are $p^F$ (block 310) and $p^B$ (block 312), respectively. Note that the SU is partially observing the state of the licensed user through sensing, transmitting, or receiving data. Hence, the SU is guessing the actual state of the PU. The master node then returns to block 208 in FIG. 2 to again apply equation (1) to find the optimal decision, and so on.

In FIG. 2, if the optimal action determined at block 208 is CS, the master node will switch to another channel (according to the applied ordering mechanism) and return to block 204 to apply the SOA until it senses an idle channel. However, if the optimal action results from equation (1) is either TR-TR (block 214) or TS-R (block 216), the master node performs the following steps shown in FIG. 2 to make its final decision. These steps correspond to the rules of the traffic and the periodic sensing stages.

For the TR-TR action in block 214, the master node (say node 1) checks its own MP bit at block 218 and that of the slave node (say node 2) at blocks 220 and 222. It then follows the rules of Table 1 to determine the final decision. If the MPs for both nodes indicate that they have more data to transmit, the method proceeds to block 226 where the TR-TR mode of operation is again recommended. Before entering this mode, the master node checks at block 230 if the time elapsed since the last sensing action (denoted by τ) is smaller than the time limit established by OSA standards (denoted by T). If the master node gets a positive result, then the nodes will proceed to the TR-TR mode of operation at block 232. Otherwise, one of the SU nodes has to carry out the sensing process depending on which one of them is the master node. If at block 240 node 1 is determined to be the master node, the nodes enter the TS-R mode at block 242. Alternatively, if at block 240 node 2 is determined to be the master node, the nodes enter the R-TS mode at block 244.

Continuing with the TR-TR action of block 214, if the master node checks its own MP bit at block 218 and the slave node MP bit at block 220 and determines that only the slave node has more data to transmit, the method proceeds to block 224 where the final decision is to enter the R-TS mode. On the other hand, if only the master node has more data to transmit, the method proceeds to block 250 where the final decision is to enter the TS-R mode. If, however, neither node has more data to transmit, the process aborts at block 246 and ends at block 248.

Returning to decision block 208, if the optimal action determined at block 208 is the TS-R action at block 216, the master node will apply the rules in Table 2 to obtain the final decision. More specifically, the master node checks its own MP bit at block 234 and that of the slave node at blocks 236 and 238. It then follows the rules of Table 2 to determine the final decision. If the MPs for both nodes indicate that they have more data to transmit, the nodes enter the TS-R mode at block 242 if node 1 is determined to be the master node at block 240. Alternatively, the nodes enter the R-TS mode at block 244 if node 2 is determined to be the master node at block 240. If neither nodes have more data to transmit, the process once again aborts at block 246 and ends at block 248.

Figure 4:
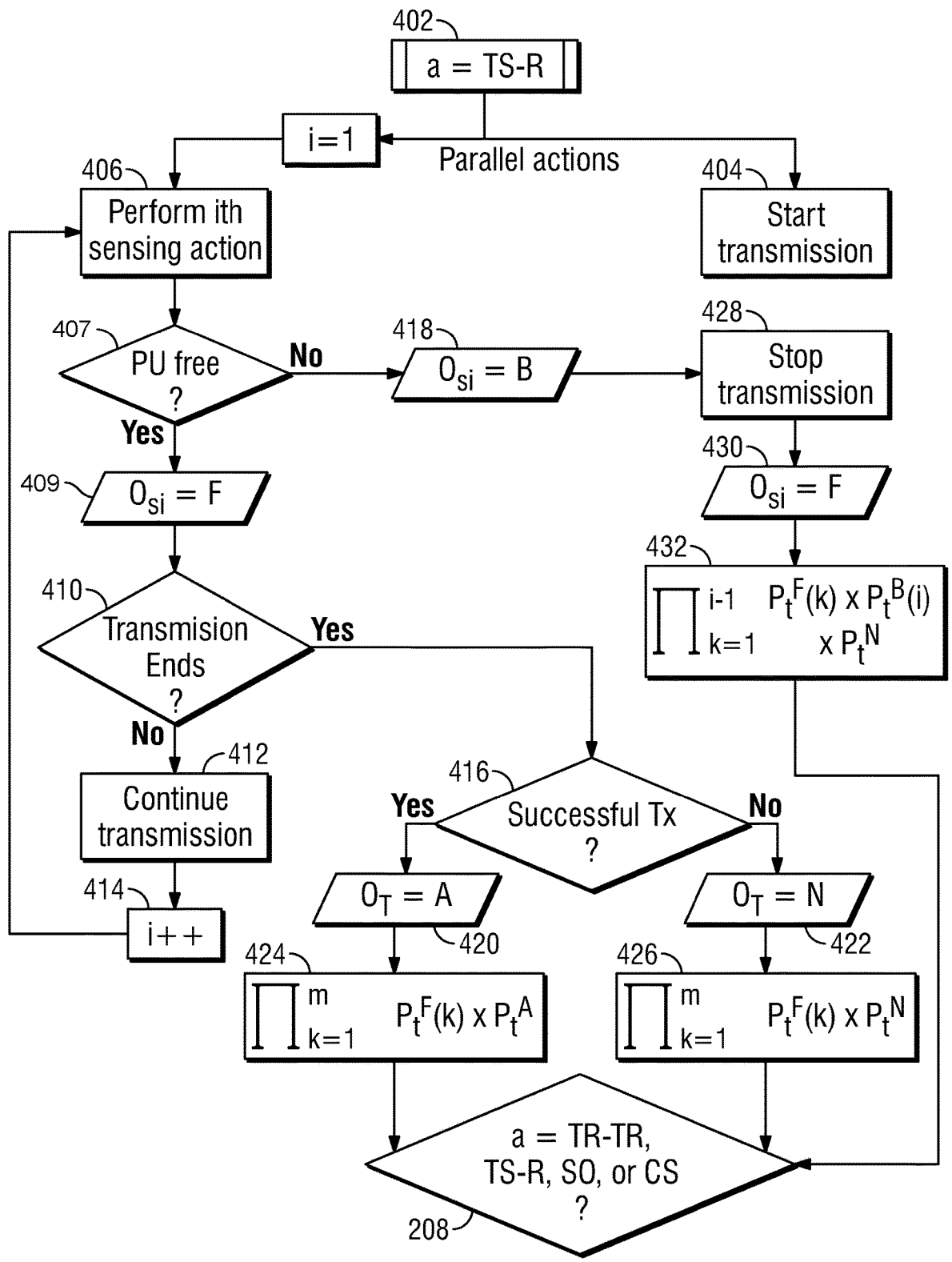
FIG. 4 is a flowchart illustrating a transmission sensing—reception (TS-R) mode of operation, which is also a flowchart for a reception—transmission-sensing (R-TS) mode since nodes interchange the master/slave roles.
Figure 5:
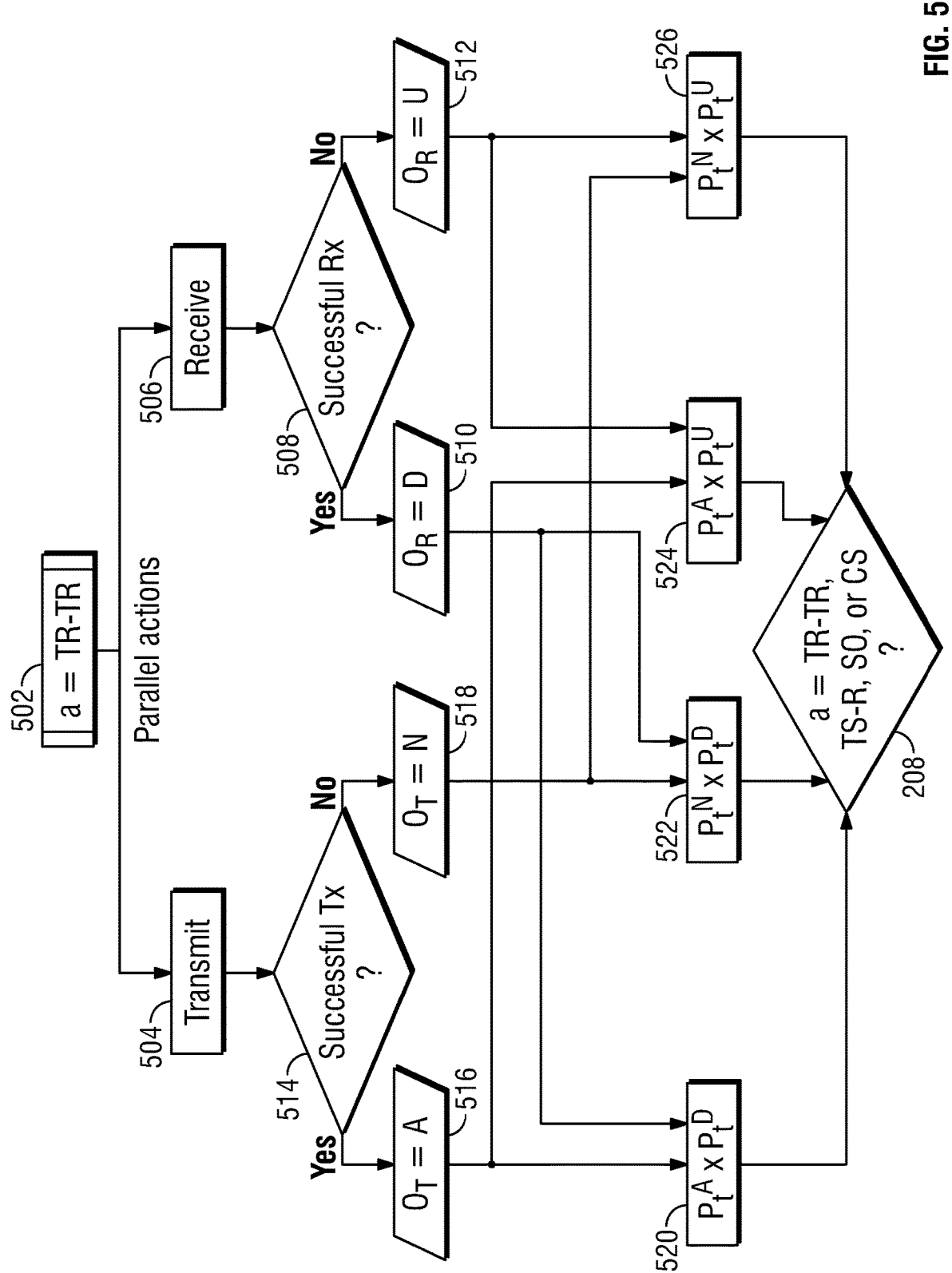
FIG. 5 is a flowchart illustrating a transmission-reception—transmission-reception (TR-TR) mode of operation.

Next, the sub-processes in FIGS. 4 and 5 are discussed, which outline the belief update process when the nodes operate in the TS-R (block 242) and TR-TR modes (block 232), respectively. As shown in FIG. 4, the SUs will operate in the TS-R mode at block 402. The master node starts transmission at block 404 and at the same time it starts sensing the spectrum during a first sensing period (i.e., i=1) at block 406. If the PU is sensed free at the end of this period (block 407), the master node saves the outcome of this sensing action as ($O_{S1}$=F) and then checks whether the transmission period has ended or not at block 410. If the master node is still transmitting, the process continues to block 412 and the counter is incremented to the next (i.e., i=2) sensing period at block 414. However, if the transmission has ended at block 410, the master node will check the outcome of the transmission process (ACK or NACK) at block 416 The observation space for the transmission process is $O_T=\{A, N\}$, which denotes ACK and NACK, respectively. If the outcome of decision block 416 is 'A' (indicating that the transmission was successful), the method proceeds to block 420 and to block 422 if the outcome is 'N' (indicating that the transmission was not successful). The belief updates in the case of ACK and NACK outcomes are $p^A$ and $p^N$, respectively. According to the combination of the outcomes of the sensing and transmission actions, the master node updates its belief by multiplying the two corresponding belief updates as shown in FIG. 4 at blocks 424 and 426, respectively, after which the method returns to the optimization problem at decision block 208 to determine the optimal action given this new belief. If at any sensing period, the PU is sensed busy at block 406, the method proceeds to block 418 and the master node will stop its transmission at block 428, leading to an outcome of "N" at block 430. The master node will update its belief by multiplying the corresponding belief updates at block 432. The process returns to the main optimization problem at block 208 to find the optimal action for the next phase.

Similarly, for the TR-TR mode shown in FIG. 5, the master node updates its belief according to the combination of the outcomes of the transmission and reception actions. As shown in FIG. 5, the SUs will operate in the TR-TR mode at block 502 and proceeds to blocks 504 and 506, where transmitting and receiving occurs in parallel. The master node checks the outcomes of the reception process at decision block 508. The observation space for the reception process is $O_R=\{D, U\}$, which denotes whether the received message has been decoded or undecoded, respectively. If the outcome of decision block 508 is 'D', the method continues to block 510. If the outcome of decision block 508 is 'U', the method proceeds to block 512. Likewise, the master node checks the outcome of the transmission process at decision block 514, where the observation space is once again $O_T=\{A, N\}$. If the outcome of decision block 514 is 'A', the method continues to block 516 and if the outcome of decision block 514 is 'N', the method proceeds to decision block 518. The belief updates in the case of decoding and undecoding outcomes are $p^D$ and $p^U$, respectively. As before, the belief updates in the case of ACK and NACK are $p^A$ and $p^N$, respectively. The master node updates its belief depending on the outcomes of the observations at blocks 520, 522, 524 or 526, after which the method returns to decision block 208.

It should be noted the roles initially assigned to the two SUs (say $SU_1$ and $SU_2$) as either a master device (MD) or a slave device (SD) may change on a per-packet basis (or, more generally, after each data phase). At the start of the communication, the SU that has data to send to the other SU assumes the role of an MD (say $SU_1$), treating the other user ($SU_2$) as an SD. Then, depending on various factors (including the feedback from $SU_2$ at the end of the data phase), this MD/SD designation may stay the same or it may be switched. Initially, the MD ($SU_1$) does not yet know if the SD has its own packets to send back, so the first mode of operation for the system is TS-R (i.e, $SU_1$ transmits data while sensing simultaneously, whereas $SU_2$ is only receiving). After that, any of the four possible actions in FIG. 2 may be taken. If after the first data phase, the current SD ($SU_2$) has data packets to send, but the current MD ($SU_1$) does not have more packets, then the TR-TR mode or the TS-R modes cannot be considered as part of the mode optimization. In this case, the current MD ($SU_1$) will relinquish its role as a master to SU B. In other words, if one of the SUs does not have more packets to send, the other device (which has packets to send) will become the master. If both SUs have data packets to send to each other, the TR-TR mode may be considered (it may or may not be the optimal mode, depending on the belief stage). If the algorithm decides that the TR-TR mode is optimal, then it does not really matter which device acts as an MD or SD. For simplicity the node that has been the master in the most recent data phase may keep this role.

Communication Protocol

A variety of control packets may be defined, which allow the SUs to communicate with one another. One illustrative set of control packets that may be employed is shown in Table 3 below.

TABLE 3

Definition of control packets

| Symbol name | Information included |
|---|---|
| ST-TX | A request to start transmission |
| ACK-CTX | Correct reception and a request to continue transmission |
| ACK-STX | Correct reception and a request to stop transmission |
| NACK-RTX | Incorrect reception and a request to retransmit the corrupted packet |
| NACK-DTX | Incorrect reception and a request to defer transmission of the corrupted packet |

These control packets allow an MD and an SD to operate in a full duplex fashion and also to switch between different modes. As shown in Table 3 an ACK-CTX packet is transmitted if the MD was able to decode the received packet correctly and the optimal policy recommends continuing to operate in the TR-TR mode. When the SD receives this packet, it will transmit a new packet to the MD. If the MD decides to switch to another mode (according to the optimal policy), it will inform the SD to stop transmission by transmitting (in the control phase) an ACK-STX packet in case of correct reception. In case of incorrect reception, the MD will transmit either a NACK-RTX packet or NACK-DTX packet to inform the SD to retransmit the corrupted packet in the next data phase or defer transmission, respectively. For a NACK-RTX packet, the SD will retransmit the corrupted packet again in the following data phase. However, for a NACK-DTX packet, the SD will save this incorrectly received packet in a buffer and keep silent for the following data phase(s) until it receives a ST-TX packet. Once it receives this control packet, it will fetch this packet from the buffer and retransmit it to the MD.

Formally, the MD (at the beginning of the three-stage algorithm) needs to inform the SD of its decision to operate in the TR-TR mode so that the SD can start transmitting while receiving. Practically, the SD needs to decode the first SU packet (from the MD) before starting transmission, as the first MD packet's header will contain some important information that is crucial to initiate the communication link. Once the link is established, both nodes can operate in TR-TR mode.

Figure 6:
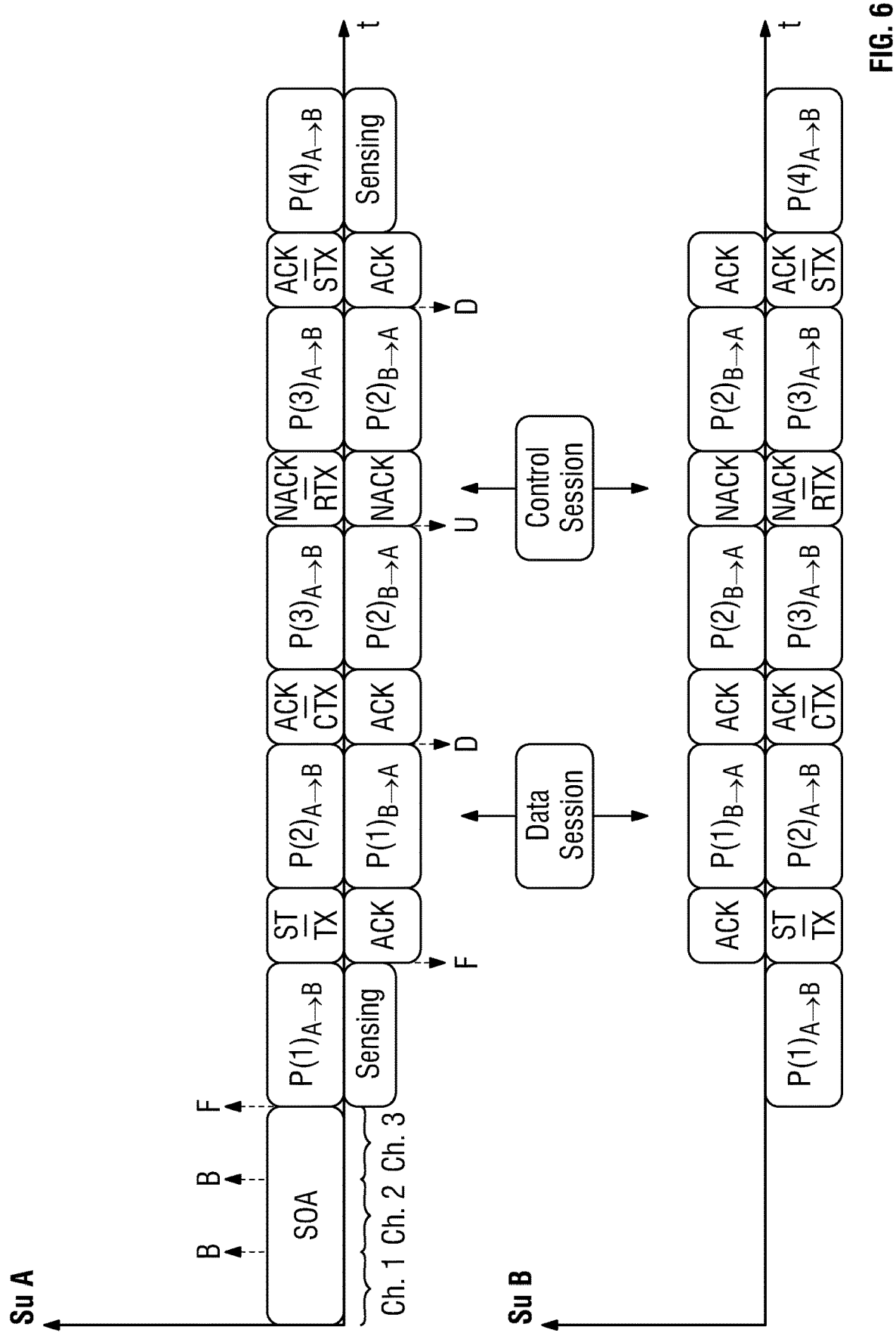
FIGS. 6 and 7 show a simplified example of two SUs that apply the adaptive algorithm discussed herein using an illustrative communication protocol.
Figure 7:
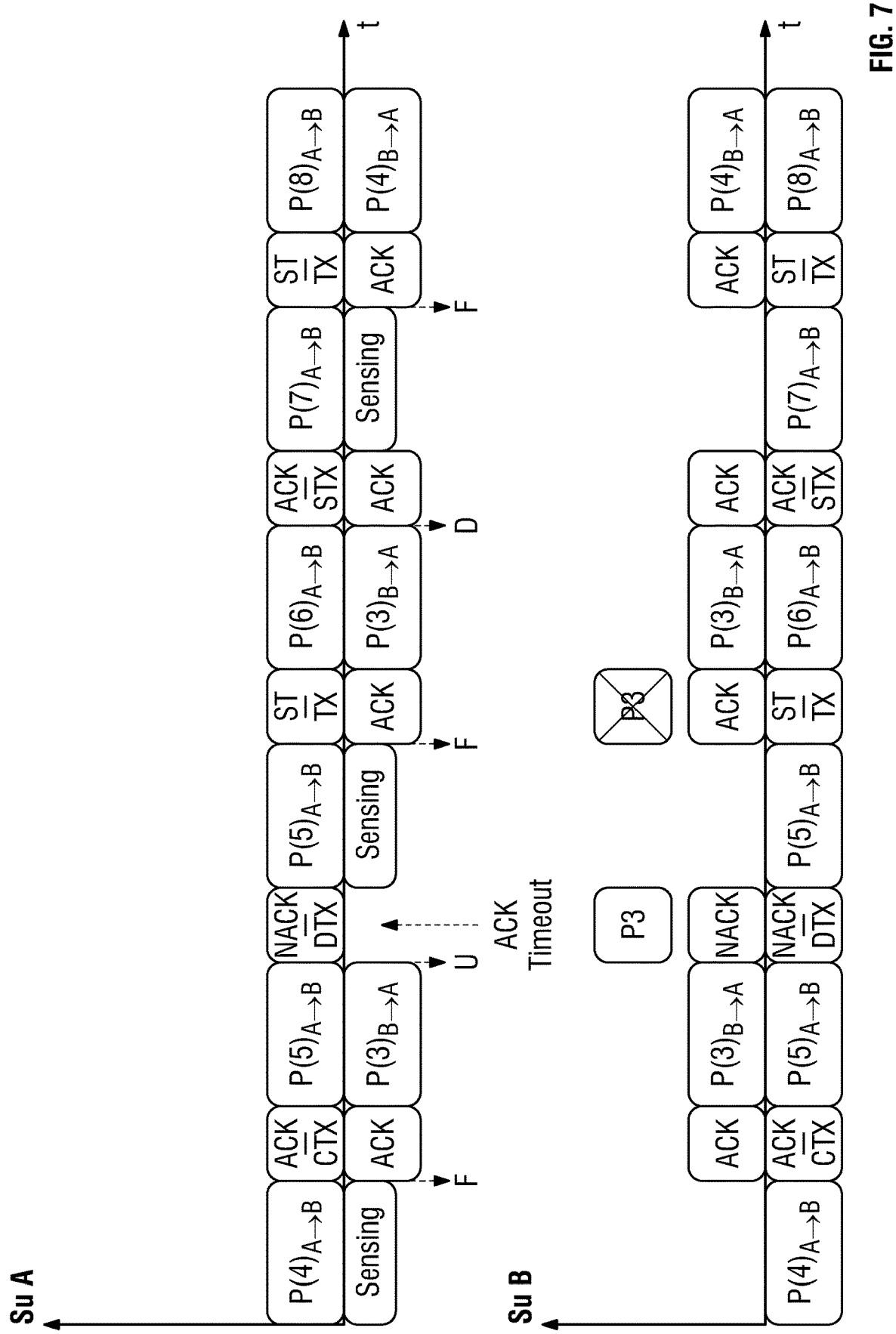

FIGS. 6 and 7 show a simplified example of two SUs (A and B) that apply the adaptive algorithm discussed herein using the communication protocol defined above. In FIG. 6, SU A wants to initiate a communication link with SU B. Hence, SU A starts by applying the SOA algorithm (i.e., sensing and switching between different channels) until channel 3 is sensed to be free. After the association process, SU A (which is the MD) starts with the TS-R mode as discussed above and transmits its first packet to SU B in the first data phase. This packet is illustrated in FIG. 6 as $P(1)_{A \to B}$, where $P(i)_{A \to B}$ denotes the transmission of the ith packet from SU A to SU B. According to the example, SU A receives an ACK and senses the channel to be free. Hence, SU A transmits a start-transmission (ST-TX) control packet to SU B in the first control phase. Now, both users are operating in the TR-TR mode. After the second data phase, both users have received ACKs and the optimal policy in that case recommends continuing in the TR-TR mode. Hence, SU A sends a continue-transmission (ACK-CTX) control packet to ask SU B (which is the SD) to continue transmission, and so on.

The example of FIG. 6 continues in FIG. 7, where the SUs operate in the TS-R mode and then switch to the TR-TR mode. At this point, SU A has not received an ACK/NACK from SU B. Hence SU A declares an ACK-timeout. Ideally, SU B should retransmit packet 3 to SU A in the next data phase. However, the optimal policy recommends the TS-R mode. Hence, SU A transmits a defer-transmission (NACK-DTX) control packet, asking SU B to defer its transmission until SU A finishes sensing. Hence, SU B saves packet 3 (P3) in the queue until it receives a start-transmission (ST-TX) control packet.

In order to switch from the TR-TR mode to the TS-R mode, the MD will use either ACK-STX or NACK-DTX, depending on whether or not the SU is able to decode the last received packet. Once the SD receives this control packet, it will stop transmission. The MD at this time can sense the spectrum during the following data phases. If the MD decides to return to the TR-TR mode, it will send a ST-TX control packet to the SD, which instructs it to start transmitting immediately at the next data phase. The SD will check whether its buffer (which contains incorrectly received packets) has a packet or not. If a packet is found, this means that the last transmission was not received correctly and the SD will fetch this packet to be retransmitted. If an empty buffer is detected, the SD will transmit a new packet.

Master and Slave Role Switching

The node operating as the MD will either be transmitting data to the SD or will be carrying out spectrum sensing. The SD is the node that receives orders from the MD to start, continue, or stop transmission. A SD can either receive data, or transmit and receive simultaneously. In the discussion above it was assumed that SU A was the MD since it is the node that initiated the communication and thus SU B was the SD. Hence, SU A was the node giving orders to SU B whether to start, continue, or stop transmission while also being able to carry out spectrum sensing while transmitting.

In various embodiments, a node will not operate continuously in its role as either a MD or SD. For instance, assume that SU A needs to sense the spectrum while transmitting, which means that the two SUs are operating in the TS-R mode. In this case SU A is transmitting to SU B while sensing the spectrum. Assume now that SU A does not have data to be transmitted, while SU B does. In that case, the SUs will switch roles, which in this example means that SU B will become the MD and the two will now operate in the R-TS mode. The reason for switching roles (and hence the operating mode) is that in some cases the MD does not have any packets to be transmitted to the SD while the SD still has packets to be transmitted.

A MD may negotiate with a SD to determine which one should be the master in any of a number of different ways. Regardless of the negotiation process used, the determination will be based on whether or not a given node has a packet to transmit. The aforementioned "more packets" (MP) bit may be used to determine whether or not a certain node has a packet in its queue to transmit, where a bit of zero indicates that the queue is empty. While the location of the MP bit may vary from implementation to implementation, in some embodiments it may be defined as a one-bit field in the MAC header. This bit may be padded to the MAC header of each data packet. After each data phase both nodes can decide which one will be the master in accordance with this bit value in the headers of the two packets exchanged by the nodes.

As discussed above, the MD is the node that is responsible for making various decisions. These decisions are made based on the belief update. Since the SD is not aware of this belief update, when an SD switches roles to the MD, the MD (which will become the SD) must transmit the belief update value to the SD that is becoming the MD. That is, depending on whether there is role switching or not, the former MD will send the belief update to the new MD. This information byte can be padded at the end of a packet, as needed.

Figure 8:
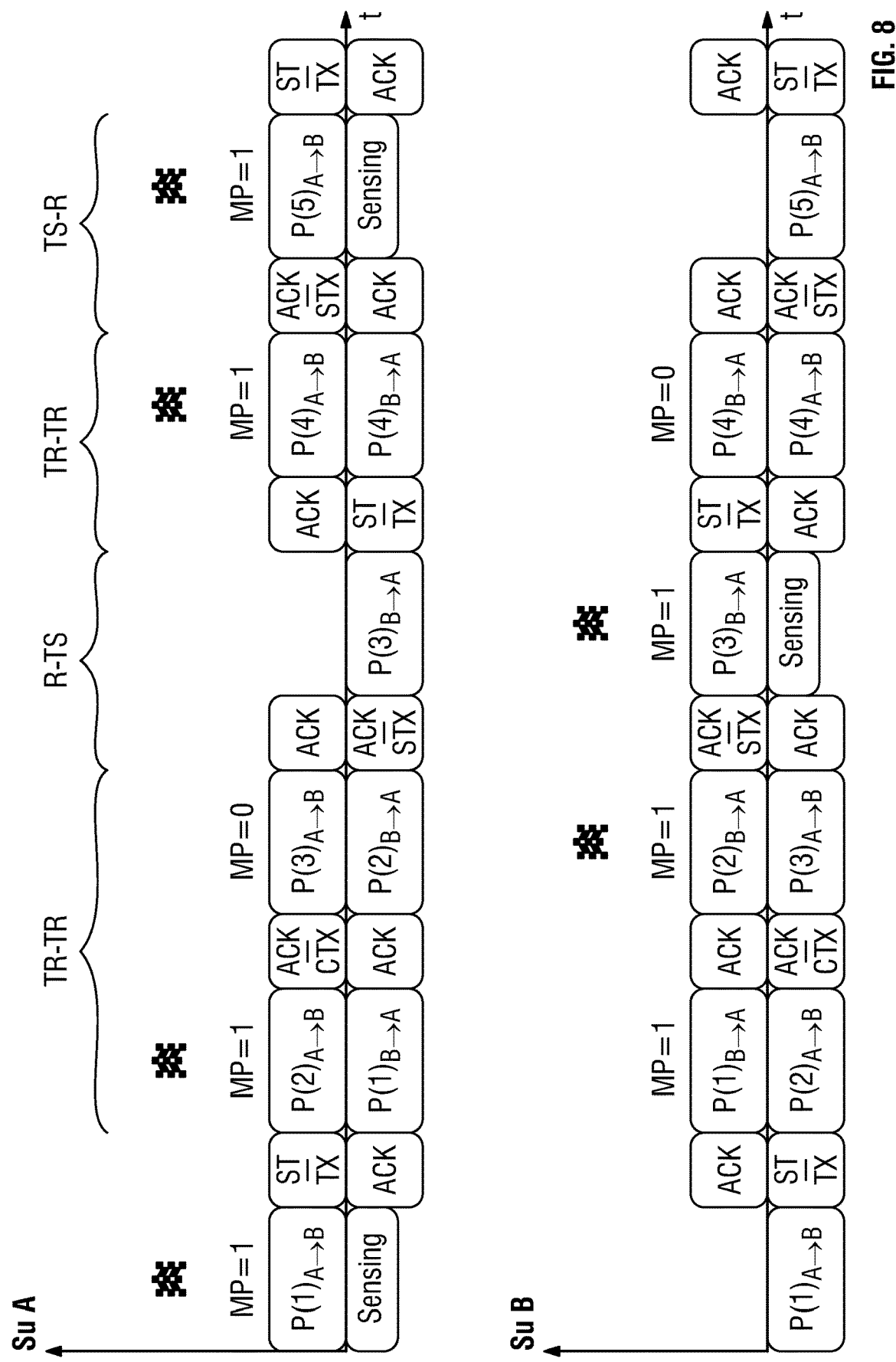
FIG. 8 illustrates the process by which master and slave devices switch roles.

FIG. 8 illustrates the process of switching roles between master and slave devices. In the second data phase, both SUs have MP=1, which means that both users still have data to transmit. Since SU A was the MD, it will continue to be the MD. In the third data phase, SU A does not have more packets to send, while SU B does. Hence, SU B will be the MD. This switching process can be accomplished in accordance with Tables 1 and 2 above.

In addition to being used to determine which node is to be the master, the MP bit may also be used to help nodes switch back and forth to and from the R-TS mode. As shown in FIG. 8 in the second data phase, both nodes are operating in the TR-TR mode. The MP bit for both nodes is one, which means that both nodes have packets in their queues. Since SU A was the MD in the first data phase, it will remain so in the second data phase. Both nodes will start the third data phase by transmitting packets to each other. Assume that SU B has packets to transmit (i.e., MP=1 for SU B), while SU A does not. In that case, SU B will be the MD and SU A will be the SD. SU B will then instruct SU A in the next control phase that it will control the communication process. In the fourth data phase, the nodes will operate in the R-TS mode, where SU A is only receiving data and SU B is transmitting and sensing the channel simultaneously. If SU B decides to return back to TR-TR mode, it will transmit a ST-TX packet to SU A.

In summary, an inherent problem in the traditional LBT scheme, widely used in OSA systems, is that the SU has to interrupt its transmission period to sense the spectrum for PU activities, which results in a reduction in the SU throughput. Using the adaptive strategy disclosed herein, the SU can carry out spectrum sensing while transmitting its data (i.e., operate in the TS mode) using SIS techniques. This has two advantages over the LBT scheme. First, from the SU perspective, transmitting while sensing will enhance the SU throughput, as it does not have to interrupt its transmission while sensing. Second, from the PU detection perspective, the SU will be able to monitor the PU activity while transmitting. Hence, a better detection performance will be achieved because in the LBT scheme there is a probability that the PU returns during the SU transmission period.

Another problem in current cognitive wireless systems is the low transmission rate. Devices have to use a multiple access scheme such as OFDMA or TDMA in order to communicate in a networked environment. They cannot transmit and receive simultaneously on the same frequency. By applying the aforementioned adaptive strategy, SUs can operate in the TR mode, which enhances the throughput.

Computing System

Figure 9:
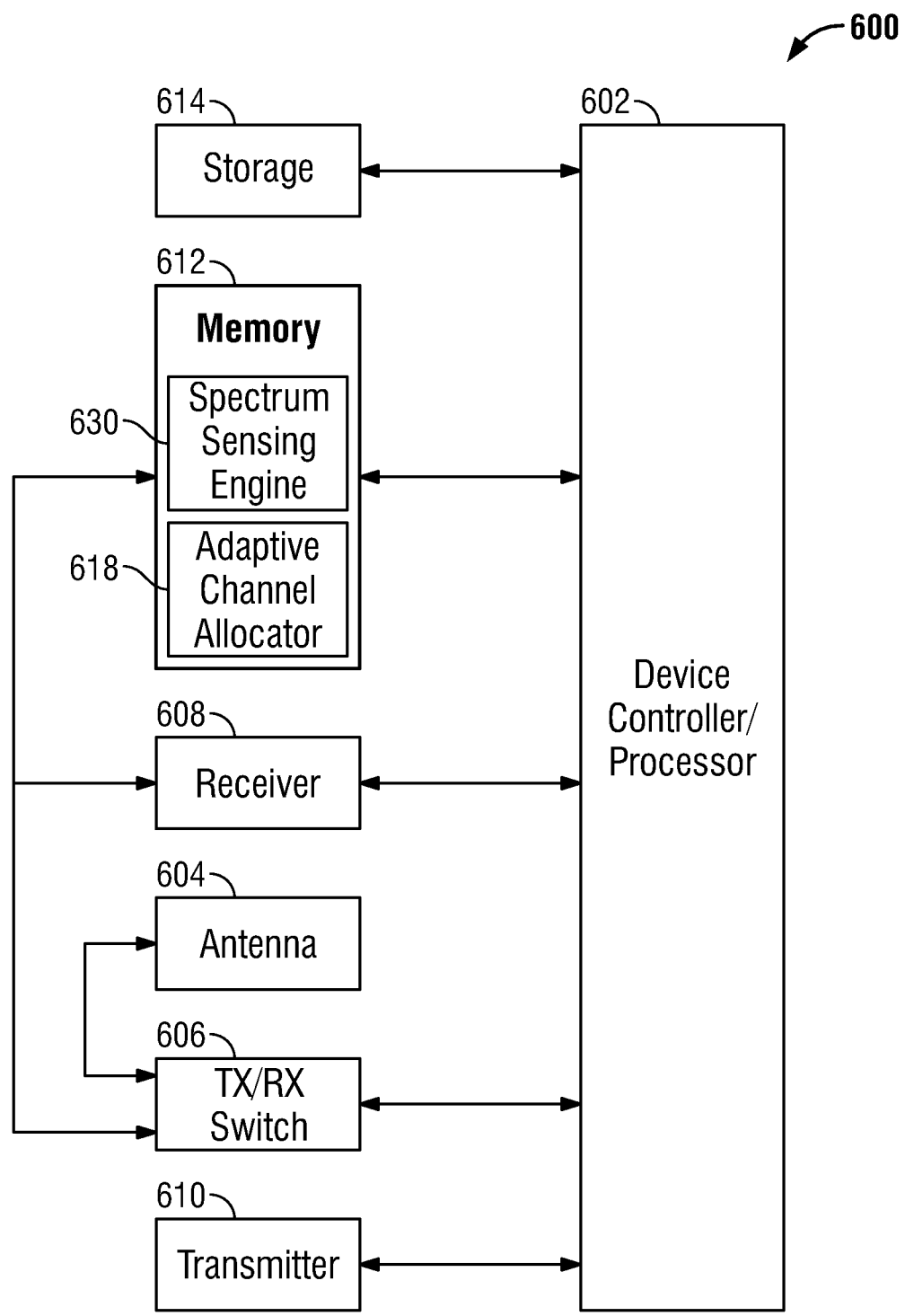
FIG. 9 is a block diagram illustrating one example of a wireless communication device.

FIG. 9 is a block diagram illustrating one example of a wireless communication device 600 of the type discussed above which may be employed as a secondary unit in a cognitive radio environment. To simplify the present description, only that portion of a wireless communication device that is relevant to the present invention is discussed. Although not required, implementations are described in the general context of computer-executable instructions, such as program modules, being executed by a computer, such as a personal computer or the like. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, cloud computing architectures, and the like. Implementations may also be practiced in distributed computing environments where tasks are performed by remote processing devices that are linked through one or more communications networks.

In a distributed computing environment, program modules may be located in both local and remote memory storage devices.

The wireless device 600 operates under the control of a device controller/processor 602 that controls the sending and receiving of wireless communication signals. In receive mode, the processor 602 electrically couples an antenna 604 through a transmit/receive switch 606 to a receiver 608. The receiver 608 decodes the received signals and provides those decoded signals to the processor 602.

In transmit mode, the device controller 602 electrically couples the antenna 604, through the transmit/receive switch 606, to a transmitter 610. It should be noted that in one embodiment, the receiver 608 and the transmitter 610 are a dual mode receiver and a dual mode transmitter for receiving/transmitting over various access networks providing different air interface types. In another embodiment a separate receiver and transmitter is used for each of type of air interface. A memory 612 includes, among other things, a spectrum sensing engine 630 for sensing wireless channels for transmissions from a primary unit. The memory 612 also includes an adaptive channel allocator 618 for conducting the three stage algorithm described above for determining when the device will switch among the different operating modes.

The wireless device 600, also includes non-volatile storage memory 614 for storing, for example, an application waiting to be executed (not shown) on the wireless device 600.

Figure 10:
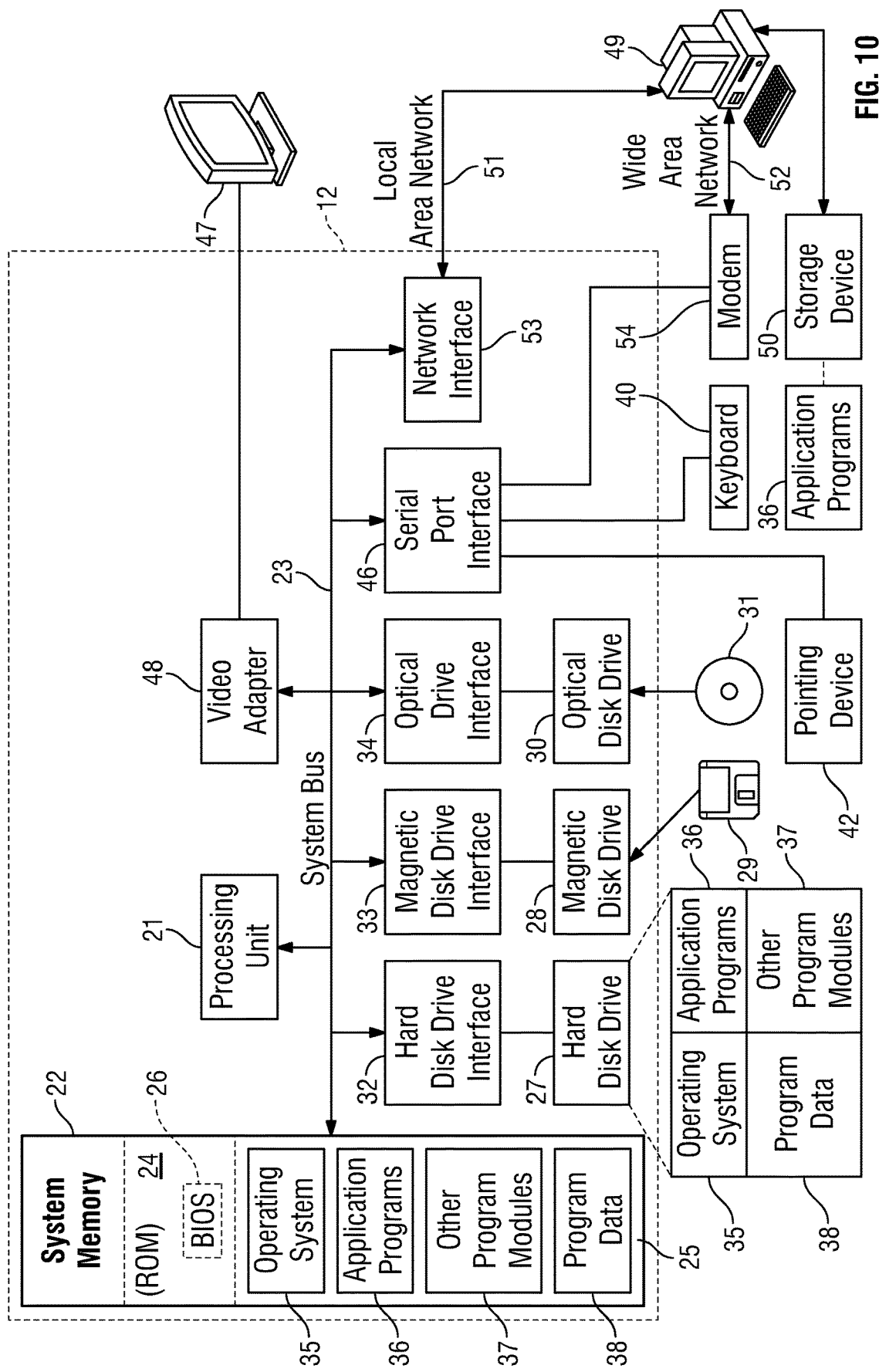
FIG. 10 is a diagram illustrating additional aspects of a wireless communication device that may be used in conjunction with implementations of the systems and methods discussed herein.

FIG. 10 is a diagram illustrating additional aspects of a wireless communication device that may be used in conjunction with implementations of the systems and methods discussed herein.

The exemplary hardware and operating environment of FIG. 10 includes a general-purpose computing device in the form of a computing device 12. The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, a mobile computing device, or any other type of computing device.

The system bus 23 may be any of several types of bus structures including a memory bus or memory controller, a peripheral bus, and a local bus using any of a variety of bus architectures. The system memory 22 may also be referred to as simply the memory, and may include read only memory (ROM) 24 and random access memory (RAM) 25. A basic input/output system (BIOS) 26, containing the basic routines that help to transfer information between elements within the computing device 12 , such as during start-up, may be stored in ROM 24.

The computing device 12 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media. The computing device 12 may also include one or more other types of memory devices (e.g., flash memory storage devices, and the like).

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37 (e.g., one or more of the modules and applications described above), and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, a universal serial bus (USB), or the like. A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 6 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such Accordingly, the invention is not limited except as by the appended claims:

1. A computer-implemented method of spectrum access for wireless communications by a secondary unit (SU) in a wireless network environment comprising one or more SUs and one or more primary units, the method comprising:
   operating a first SU in an initial sensing-only (SO) mode, the SO mode executing a sensing-only algorithm configured to facilitate detection of an idle channel of the wireless network;
   determining, with the first SU operating in the SO mode, an optimal action that maximizes a utility by selecting from among actions that include operating in a "transmission-sensing" (TS) mode, a transmission-reception (TR) mode, a SO mode or a "channel switching" (CS) mode, wherein the utility denotes a benefit that arises from operating in each of the modes, wherein operating in the TS mode includes sensing a channel of the network for transmission by the one or more primary units while simultaneously transmitting data over the channel of the network to a second SU by suppressing self-interference on the first SU caused by transmitting data, wherein operating in the TR mode includes receiving data over the channel of the network from the second SU while simultaneously transmitting data over the channel of the network by suppressing self-interference on the first SU caused by transmitting data; and
   if the optimal action is operating in the SO or CS modes, maintaining the first SU in the SO mode or switching operation of the first SU from the SO mode to the CS mode, respectively; and
   if the optimal action is operating in the TR or TS mode, switching operation of the first SU from the SO mode to another mode based on whether the first and second SUs have more data to transmit.

2. The computer-implemented method of claim 1, wherein the benefit includes a link throughput that arises from operating the first and second SUs in each of the modes.

3. The computer-implemented method of claim 1 wherein a belief that denotes a probability that the channel is idle is initially assumed to have a probability of 1.

4. The computer-implemented method of claim 3, wherein if the optimal action is to operate in the SO mode and the first SU maintains operation in the SO mode, updating the belief based on a result of the sensing.

5. The computer-implemented method of claim 1, further comprising switching between the TS mode and the TR mode based on a probability determination obtained while operating in the TS mode or TS mode, the probability determination determining a likelihood that the channel is idle.

6. The computer-implemented method of claim 1, further comprising sensing the channel of the network for transmissions by the one or more primary units according to a predetermined periodic sensing interval.

7. The computer-implemented method of claim 1, wherein if the optimal action is to operate in the TR mode, determining if both of the first and second SUs have more data to transmit to each other and, if both of the first and second SUs are determined to have more data to transmit, causing both the first and second SUs to operate in the TR mode.

8. The computer-implemented method of claim 7, wherein determining if the second SU has more data to transmit further comprises examining a specified data field in a transmission received from the second SU.

9. The computer-implemented method of claim 1, wherein if the optimal action is operating in the TR or TS mode, determining if the first or second SUs have more data to transmit and, if only one of the first and second SUs are determined to have more data to transmit, causing one of the first and second SUs to operate in the TS mode and the other of the first and second SUs to operate in a receive-only mode.

10. The computer-implemented method of claim 9, further comprising, while the first or second SU transmits more data, performing a sensing action with the first or second SU that is operating in the TS mode and if the one or more primary units is sensed as busy, stopping transmission.

11. The computer-implemented method of claim 1, wherein while operating in the TR mode, determining if the first or second SUs have more data to transmit and, if only one of the first and second SUs is determined to have more data to transmit, causing the SU having more data to transmit to operate in the TS mode while causing the other SU to operate in a receive-only mode.

12. The computer-implemented method of claim 11, wherein if at a first time only the first SU has data to transmit, the first SU assumes a role of a master device that is operable in the TS and TR modes and the second SU assumes a role of a slave device operable in the TR mode and inoperable in the TS mode.

13. The computer-implemented method of claim 12, wherein if at a second time only the second SU has data to transmit, causing the first and second SU to switch roles so that the first SU is a slave node and the second SU is a master node.

14. The computer-implemented method of claim 13, wherein the slave node is also operable in the receive-only mode.

15. A computer-implemented method of spectrum access for wireless communications by a secondary unit (SU) in a wireless network environment comprising one or more SUs and one or more primary units, the method comprising:
   operating a first SU in an initial sensing-only (SO) mode, the SO mode executing a sensing-only algorithm configured to facilitate detection of an idle channel of the wireless network;
   determining, with the first SU operating in the SO mode, an optimal action that maximizes a utility by selecting from among actions that include operating in a "transmission-sensing" (TS) mode, a transmission-reception (TR) mode, a SO mode or a "channel switching" (CS) mode, wherein the utility denotes a benefit that arises from operating in each of the modes, wherein operating in the TS mode includes sensing a channel of the network for transmission by the one or more primary units while simultaneously transmitting data over the channel of the network to a second SU by suppressing self-interference on the first SU caused by transmitting data, wherein operating in the TR mode includes receiving data over the channel of the network from the second SU while simultaneously transmitting data over the channel of the network by suppressing self-interference on the first SU caused by transmitting data; and if the optimal action is operating in the SO or CS modes, maintaining the first SU in the SO mode or switching operation of the first SU from the SO mode to the CS mode, respectively; and if the optimal action is operating in the TR or TS mode, switching operation of the first SU from the SO mode to another mode based on whether the first and second SUs have more data to transmit;

wherein if the optimal action is operating in the TR or TS mode, determining if the first or second SUs have more data to transmit and, if both of the first and second SUs are determined to have more data to transmit, determining if an elapsed time since a last sensing action exceeds a specified duration and if the specified duration is exceeded, causing one of the first and second SUs to operate in the TS mode and the other of the first and second SUs to operate in a receive-only mode.

16. The computer-implemented method of claim 15, wherein the benefit includes a link throughput that arises from operating the first and second SUs in each of the modes.

17. The computer-implemented method of claim 15 wherein a belief that denotes a probability that the channel is idle is initially assumed to have a probability of 1.

18. The computer-implemented method of claim 17, wherein if the optimal action is to operate in the SO mode and the first SU maintains operation in the SO mode, updating the belief based on a result of the sensing.

19. The computer-implemented method of claim 15, further comprising switching between the TS mode and the TR mode based on a probability determination obtained while operating in the TS mode or TS mode, the probability determination determining a likelihood that the channel is idle.

* * * * *